United States Patent [19]

Smith et al.

[11] 3,906,543

[45] Sept. 16, 1975

[54] SOLID STATE IMAGING APPARATUS EMPLOYING CHARGE TRANSFER DEVICES

[75] Inventors: George Elwood Smith, Murray Hill; Frederick Vratny, Berkeley Heights, both of N.J.

[73] Assignee: Bell Telephone Laboratories, Incorporated, Murray Hill, N.J.

[22] Filed: Dec. 17, 1973

[21] Appl. No.: 425,329

Related U.S. Application Data

[63] Continuation of Ser. No. 211,541, Dec. 23, 1971, abandoned.

[52] U.S. Cl. .................... 357/24; 357/23; 357/30; 307/304; 307/221 D

[51] Int. Cl.$^2$ ............... H01L 79/78; H01L 27/14; H01L 31/00; H03K 33/53

[58] Field of Search .......... 357/24, 23, 30; 307/304, 307/221 D

[56] References Cited

UNITED STATES PATENTS 3,676,715 7/1972 Brojdo .............................. 307/304

OTHER PUBLICATIONS

Altman, Electronics, June 21, 1971, pp. 50–59.

*Primary Examiner*—Martin H. Edlow
*Attorney, Agent, or Firm*—G. W. Houseweart; L. H. Birnbaum

[57] ABSTRACT

There is described a solid state imaging array employing solid state scanning and the charge coupled device mode of operation. Upon the top surface of a semiconductor wafer there is disposed a transparent dielectric layer over which there is, in turn, disposed a transparent conductive sheet. This structure is adapted, e.g., through an array of thick-thin dielectric portions or through an array of zones of fixed charge, such that application of a voltage to the conductive sheet produces an array of potential wells in the wafer. Upon the bottom surface of the wafer there are disposed a plurality of charge coupled device information channels, the rows of the array potential wells associated with the front surface of the wafer being aligned with the information channels disposed over the bottom surface of the wafer. In operation, irradiating the top surface produces charge carriers in the potential wells there; and, periodically, these photogenerated charge carriers are transferred through the wafer and into the potential wells associated with the information channels on the bottom surface, where the charge is read out in conventional, serial, charge coupled device fashion.

22 Claims, 8 Drawing Figures

SOLID STATE IMAGING APPARATUS EMPLOYING CHARGE TRANSFER DEVICES

CROSS REFERENCE TO RELATED APPLICATION

U.S. Pat. application Ser. No. 98,619, filed Dec. 16, 1970, on behalf of W. S. Boyle and G. E. Smith, discloses and claims subject matter related to the instant invention.

This is a continuation, of application Ser. No. 211,541 filed Dec. 23, 1971, which is now abandoned.

BACKGROUND OF THE INVENTION

This invention relates to solid state imaging apparatus; and, more specifically, to such apparatus employing charge transfer devices for solid state scanning.

Heretofore, devices generally available for sensing optical images and for converting them into electrical signals have employed electron beam scanning. Such devices suffer from several inherent limitations, among which are relatively large size and relative fragility inasmuch as delicate, evacuated glass envelopes usually have been employed.

As techniques for fabricating monolithic integrated circuits have advanced and as integrated circuit costs have decreased, a growing interest in solid state scanning of imaging systems has become evident. For example, in U.S. Pat. No. 3,453,507, issued July 1, 1969, to A. I. Archer, there is disclosed solid state imaging apparatus employing junction field-effect transistors and orthogonally disposed semiconductor zones and electrode patterns for enabling coincident selection for solid state scanning. Such apparatus is not known to have found significant commercial use, however, primarily because of undue complexity in fabrication and undue complexity in operation.

Recently a new class of semiconductor devices adapted for information storage and manipulation have been proposed and have become known in the art as charge transfer devices. Such devices were first described in U.S. Pat. application Ser. No. 11,541, filed Feb. 16,1970, in the names of W. S. Boyle and G. E. Smith. In these devices information is represented in the form of packets of mobile charge carriers localized in induced potential energy minima in suitable storage media such as semiconductors. It was early recognized that such apparatus should prove advantageous for imaging applications; and, in fact, a basic form of imaging scheme was disclosed as one embodiment in the aforementioned Boyle-Smith application. That basic device suffers from the fact that light is continually incident on the charge coupled devices both during the sensing mode and the read-out mode, thus causing a smearing of the image.

An improvement over the aforementioned Boyle-Smith imaging apparatus, disclosed in the copending U.S. Pat. application Ser. No. 124,735, filed Mar. 16, 1971, in the name of M. F. Tompsett, involves the use of two laterally disposed arrays of charge coupled devices, one functioning as an optical sensing array and the other functioning as a storage and read-out array. Photogenerated charge carriers are collected in potential wells associated with the information channels of the sensing array in proportion to the intensity of incident light. Periodically these charge carriers are transferred rapidly laterally to the potential wells associated with the information channels of the storage and read-out array which is shielded from incident light. In this fashion signals can be read out from the storage and read-out array at a relatively leisurely pace without incurring smearing of the optical information while sensing proceeds in the sensing array. Unfortunately, this apparatus suffers from the need for a pair of laterally disposed arrays and from a requirement that information should be transferred rapidly laterally into the shielded storage array. The latter-mentioned problem arises from the fact that the transfer efficiency of a charge coupled device is known to decrease as the speed of transfer increases.

SUMMARY OF THE INVENTION

An object of this invention is an improved solid state imaging apparatus advantageously adapted for solid state scanning, i.e., without the need for electron beam scanning, and without incurring the aforementioned and other problems or fundamental limitations.

More specifically, an object of this invention is a simple, physically small, inexpensive and highly sensitive solid state imaging apparatus which avoids the need for rapid charge transfer.

To these and other ends in apparatus in accordance with this invention the sensing function is performed by an array of potential wells on one side of a semiconductor wafer; and, periodically, the integrated photogenerated charge is transferred through the wafer and collected by a plurality of potential wells associated with a plurality of charge transfer device type information channels on the other side of the semiconductor wafer. In this fashion, most efficient use is made of the volume of material, inasmuch as the sensing array and the read-out array are vertically disposed rather than laterally disposed and the requirement for rapid transfer of charge from the sensing regions is obviated, inasmuch as only a single parallel transfer from the front to the back of the wafer is required.

More specifically, in accordance with a preferred embodiment of this invention a thin, transparent conductive sheet is disposed over a thin, transparent dielectric layer which, in turn, is disposed over a front surface of a semiconductor wafer. This conductor-dielectric-semiconductor structure is adapted, e.g., through an array of thick-thin dielectric portions or through an array of zones of fixed charge, such that application of a voltage to the conductive sheet produces an array of potential wells in the semiconductor in which photogenerated charge carriers can be collected and integrated. On the bottom surface of the semiconductor wafer there are disposed a plurality of charge transfer information channels, these information channels being substantially aligned with either the rows or the columns of the arrays of potential wells on the front surface.

In operation, irradiation of the front surface produces photogenerated charge carriers which are collected and integrated in the potential wells associated with the conductive sheet over the front surface. Periodically, these charge carriers in all of these potential wells on the front surface are transferred in parallel through the wafer to the potential wells associated with the information channels on the bottom surface. Once the transferred carriers are in these information channels at the bottom surface, newly photogenerated carriers can continue to be collected and integrated in the potential wells associated with the front surface, while the charge carriers in the information channel associated with the bottom surface are read out at a leisurely pace in conventional serial charge transfer fashion.

It will be appreciated that the means for producing the array of potential wells associated with the front surface of the wafer and the charge transfer device means associated with the bottom surface may take any of a great variety of forms known to the art, many of which will be either specifically described or alluded to in the detailed description hereinbelow.

BRIEF DESCRIPTION OF THE DRAWING

The aforementioned and other objects, features, and advantages of the invention and the invention in general will be better understood from the following more detailed description taken in conjunction with the accompanying drawing in which.

It will be appreciated that for simplicity and clarity of explanation the figures have not entirely been drawn to scale; and, further, it will be appreciated that reference numerals have been repeated from figure to figure to indicate corresponding elements where appropriate.

DETAILED DESCRIPTION

Figure 1:
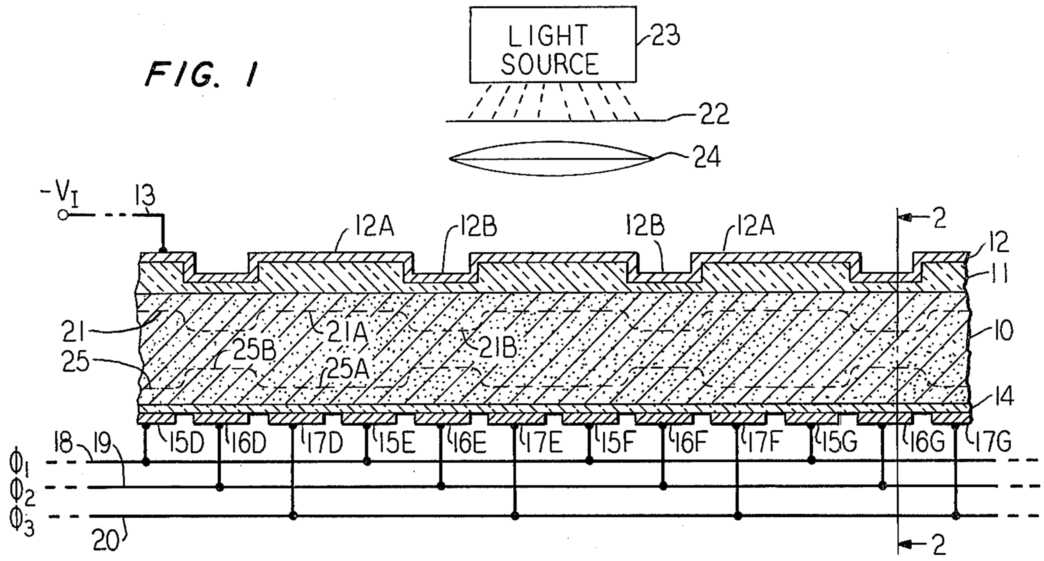
FIG. 1 is a cross-sectional view of a basic imaging device in accordance with this invention and adapted primarily for solid state scanning in the form of three-phase charge transfer device operation.

With more specific reference now to the drawing, FIG. 1 shows a cross-sectional view of a portion of a basic imaging array in accordance with this invention. As shown, the apparatus includes a photosensitive bulk portion 10 suited for charge transfer device operation and which, for purposes of illustration, will be taken to be N-type silicon. Overlying a first surface (hereinafter referred to as the front surface) of the bulk 10 is a dielectric layer 11 which is transparent and which, for purposes of illustration, will be taken to be silicon oxide. Disposed on top of dielectric layer 11 is a single conductive sheet 12 which also advantageously is transparent and which, for purposes of illustration, will be taken to be about 100 A of gold or 1000 A of conductive tin oxide.

As shown in FIG. 1, dielectric layer 11 is of nonuniform thickness, having regularly spaced regions of two distinct thicknesses. Those portions of conductive sheet 12 overlying the thicker regions of dielectric 11 are denoted 12A; and those portions of conductive sheet 12 overlying the thinner regions of dielectric layer 11 are denoted 12B. These thickness variations serve primarily to cause an array of local potential energy minima along the surface of bulk portion 10 while voltage is applied to conductive sheet 12. More specifically, FIG. 1 shows the operating condition in which a voltage, denoted $-V_I$, is applied through a conductor 13 to the conductive sheet 12 so as to cause a nonequilibrium depletion region adjacent the front surface of bulk 10. The lower boundary of this depletion region is denoted by broken line 21 which is seen to extend deeper into the bulk in portions, denoted 21B, which underlie conductive portions 12B than in other portions, denoted 21A, which underlie conductive portions 12A.

In operation, the image of an object such as 22 is projected onto the front surface of the bulk portion through the transparent conductive sheet 12 and the transparent dielectric layer 11 by means of a light source 23 and a lens 24. Charge carriers which are photogenerated near the front surface are collected by the depletion region 21 all along the front surface; and, as will be appreciated, are drawn into the deeper portion 21B closest to which they were collected. As is known, the length of time which mobile minority charge carriers can be stored without significant deterioration in signal integrity in presently readily available semiconductive material is limited by thermal generation of minority carriers to times of the order to about one second. Such times, however, are more than sufficient for storing the photogenerated charge until it can be transferred to the back surface in the manner now to be described.

With reference now to the structure associated with the back surface of bulk 10 in FIG. 1, it is seen that a dielectric layer 14 is disposed thereover and that a plurality of localized, regularly spaced electrodes 15D, 16D, 17D,...17G are disposed in sequence thereover from left to right. Electrodes 15, 16, and 17 are connected respectively to conduction paths 18, 19, and 20, to which, in turn, are applied three-phase clock voltages $\phi_1$, $\phi_2$, and $\phi_3$. It will be appreciated that this structure is that of a three-phase charge coupled device of the basic type described in the aforementioned Boyle-Smith application. A broken line 25, having deeper portions 25B and shallower portions 25A, represents the approximate position of the boundary of the depletion regions extending into the bulk portion 10 in operation of the charge coupled devices.

Figure 2A:
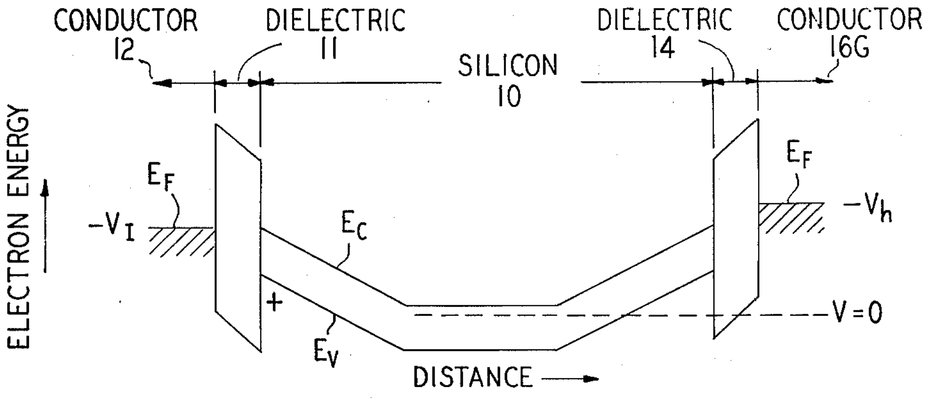
FIGS. 2A–2C are energy band diagrams depicting the energies which occur along line 2—2 of FIG. 1 during basic modes of operation in accordance with this invention.
Figure 2B:
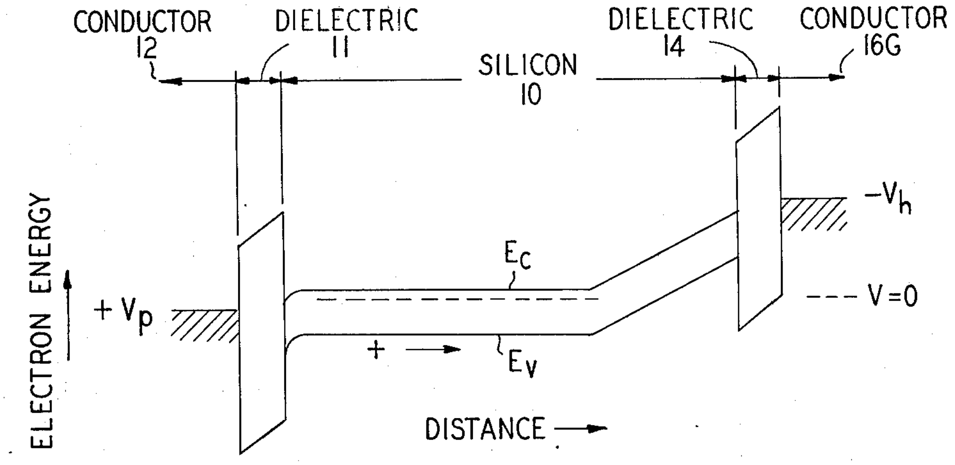
Figure 2C:
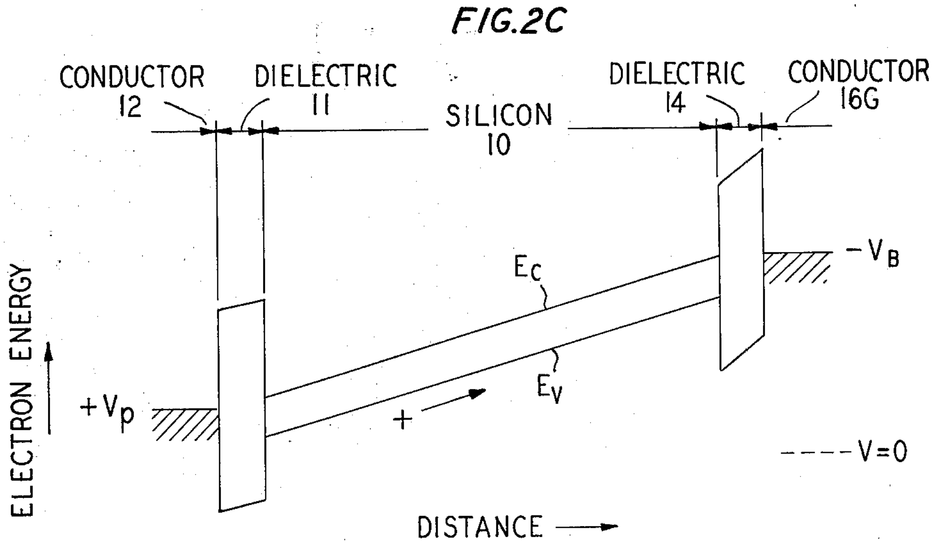

With reference now to FIGS. 2A–2C, there are depicted energy band disgrams illustrating the relevant energies occuring along line 2—2 in FIG. 1 during certain basic modes of operation now to be described. In accordance with conventions commonly employed in the art, positive voltage and positive energy are represented as increasing downward in the figures, with the result that electron energy is shown increasing upward. From left to right in FIGS. 2A–2C are represented the relevant energy levels in the portion 12A of conductive sheet 12, dielectric 11, bulk portion 10 which is assumed to be N-type silicon, dielectric 14, and electrode 16G. In the dielectric portions and in the semiconductive portion, the lower edge of the conduction band (denoted $E_C$) and the upper edge of the valence band (denoted $E_V$) are shown. The approximate position of the Fermi level is illustrated in the conductive portions 12 and 16.

FIG. 2A represents the energy band levels for the condition in which a negative voltage $-V_I$ is applied to conductive sheet 12, a somewhat more negative voltage (denoted $-V_h$) is applied through conductor 19 to electrodes 16 and a somewhat less negative voltage (not shown in FIG. 2A) is applied through conduction paths 18 and 20 to electrodes 15 and 17. In this condition, carriers photogenerated near the front surface of bulk portion 10 are swept into potential 21B. The wafer is assumed to be sufficiently thick compared to the absorption depth so that only an insignificant number of carriers diffuse to potential wells 25B associated with the back surface. Inasmuch as the absorption length for visible light in silicon ranges from about 0.1 to 5.0 microns, the thickness of bulk portion 10 typically should be about 15$\mu$ or larger.

With more specific reference now to FIG. 2A, it is seen that at the interface between bulk portion 10 and front dielectric 11 the energy bands bend upward, which implies that this region is a capture area, i.e., an area of locally lowest potential energy, for free holes. This, of course, is the energy band representation of the potential wells 21B in FIG. 1. Similarly, near the interface between the back surface of bulk portion 10 and dielectric 14 the energy bands also bend upward indicating another local capture area for holes. This, of course, is the energy band representation of the potential wells 25B in FIG. 1.

Referring now to FIG. 2B, energy bands are again shown for the structure of FIG. 1, except that in FIG. 2B it is assumed that an approximately zero or slightly positive voltage (denoted $+V_p$) instead of $-V_I$, has been applied to conductive sheet 12. For the purpose of this invention and for the purpose of this description, it will be appreciated that $V_p$ may be any voltage near zero or positive, its function being to release carriers from potential wells 21B so that they are free to diffuse to the other side of bulk portion 10 where they can be captured by the closest local potential minimum 25B. This implies that for maximum sensitivity bulk portion advantageously is thin compared to a diffusion length for the carriers, in this case holes, and for maximum resolution, thin compared to the spacing between the potential wells 25B on the reverse side of the wafer. It will be appreciated that such dimensions are comparable to those in the silicon diode array camera tube which is now well known in the art, e.g., 15 microns in thickness.

Referring to FIG. 2C, there is shown an alternate method of transferring photogenerated carriers from the front surface to the back surface. As shown, the zero or somewhat positive voltage $V_p$ again is shown applied to conductive sheet 12 so as to release carriers stored in potential wells there; and a large negative voltage (denoted $-V_B$) is shown applied to electrodes 16 of sufficient magnitude that depletion regions 25B are made to extend entirely through the wafer to the front surface thereof. This is indicated by the monotonic sloping of the energy bands throughout the silicon portion in FIG. 2C. The principal advantage of this latter mode of operation is that an electric field exists to propel the carriers from the front surface to the back, thereby speeding up the transfer operation. After the carriers have been transferred, negative voltage $-V_I$ is restored to conductive sheet 12; negative voltage $-V_B$ is returned to a less negative voltage; and integration of further photogenerated carriers resumes adjacent the front surface while carriers which have been transferred into the potential wells 25B associated with the back surface are read out using conventional three-phase voltages $\phi_1$, $\phi_2$, and $\phi_3$.

It should be understood that, for a mode of operation such as depicted in FIG. 2C, the zero or positive voltage $V_p$ need not to be applied to conductive sheet 12 to release the stored carriers; and, in fact, the voltage there need not be changed from $-V_I$. All that is required is that $-V_B$ be sufficiently large with respect to whatever voltage exists on conductive sheet 12 such that the energy bands are monotonically sloping throughout the silicon portion as depicted in FIG. 2C.

It should also be appreciated that, for a mode of operation such as depicted in FIG. 2C, the thickness of bulk portion 10 need not be thin compared to a diffusion length because, in many cases, it is possible to make depletion regions 25B extend to a distance greater than a diffusion length through bulk portion 10 to collect the carriers stored at the front surface. For example, where portion 10 is gallium arsenide, lifetimes typically are very short and so diffusion lengths are very short, but depletion regions can be made to extend for relatively very large distances therein. It must be understood, however, that for this mode of operation the wafer must be sufficiently thin that depletion regions 25B can be made to extend completely through the wafer without causing avalanche breakdown. Avalanche would generate copious quantities of mobile charge carriers which would prevent detection of the signal carriers at the back surface.

Having set forth the basic modes of operation of apparatus in accordance with this invention, there will now be described with reference to FIGS. 3 and 4 two other embodiments employing different means for producing the potential wells adjacent the front surface of the structure; and, in FIG. 3 different means for collecting and reading out photogenerated carriers at the back surface of the wafer.

Figure 3:
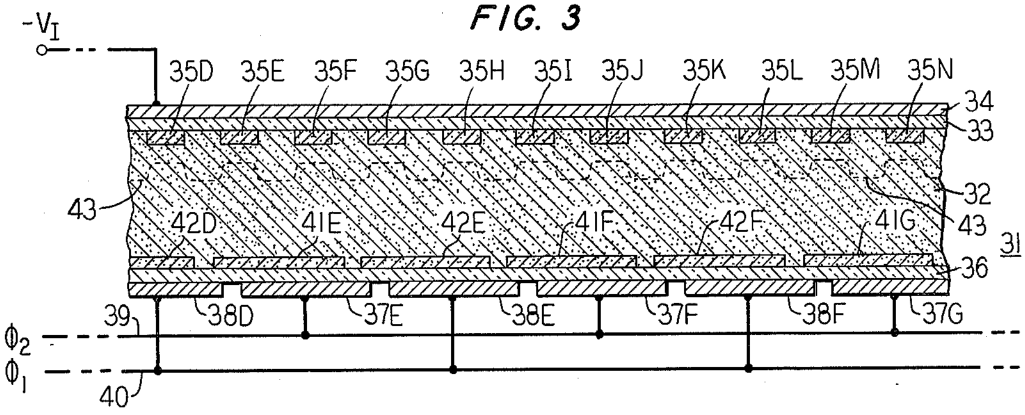
FIG. 3 is a cross-sectional view of another embodiment in accordance with this invention in which zones of fixed charge are employed to establish the array of potential wells associated with the front surface of the wafer and in which "bucket-brigade" read-out is employed on the bottom surface of the wafer to achieve the solid state scanning.

In FIG. 3 there is shown a cross-sectional view of an embodiment of this invention in which zones of immobile charge are disposed in an array of rows and columns along the front surface of the apparatus for establishing the array of potential wells for collecting and integrating the charge and in which a "bucket-brigade" structure is disposed at the back surface for collection and read-out of carriers for accomplishing the solid state scanning of the array. More specifically, water portion 31 of FIG. 3 is seen to include a bulk portion 32 which may be, and which, for illustration, will be taken to be, identical to bulk portion 10 of FIG. 1. A first dielectric layer 33, of uniform thickness in this embodiment, is disposed over the surface of bulk portion 32; and a conductive sheet 34 is disposed over the surface of dielectric 33 for establishing the array of potential wells. A great plurality of localized zones of immobile charge, shown here illustratively as P-type zones 35D, 35E,...35N disposed within N-type bulk portion 32, are disposed in an array of rows and columns at the interface between dielectric 33 and bulk portion 32. As taught in the copending U.S. Pat. application Ser. No. 157,509, filed June 28, 1971, in the names of R. H. Krambeck and R. H. Walden, and in copending U.S. Pat. application Ser. No. 157,507, filed June 28, 1971, in the names of G. F. Amelio, R. H. Krambeck, and K. A. Pickar, application of a voltage to an electrode overlying a zone, such as any of zones 35, produces a smaller change in surface potential under the zone than under the regions between any of the zones. This is because many of the field lines terminate on the immobile charge associated with the zones. The result, in accordance with the teachings of the aforementioned applications, is the creation of a potential well configuration such as depicted by broken line 43. As is also taught in these Krambeck et al and Amelio et al cases, the zones of fixed charge need not be disposed in the semiconductor but may as well be located in dielectric 33 above the semiconductor but below the conductive sheet. At present, however, it is easier to fabricate the zones in the semiconductor.

Associated with the back surface of bulk portion 32 is a bucket-brigade structure of the type disclosed in U.S. Pat. No. 3,603,808, issued Sept. 7, 1971, to S. L. J. Sangster, and as further disclosed in U.S. Pat. No. 3,660,697, issued May 2, 1972, to C. N. Berglund and H. J. Boll. As seen, the bucket-brigade structure includes a dielectric layer 36 of uniform thickness disposed over the back surface of bulk portion 32 and a plurality of localized electrodes 37 and 38 serially disposed over the surface of dielectric 36. Disposed at the interface between the back surface of bulk portion 32 and dielectric 36 are a plurality of P-type localized zones 42D, 41E,...41F registered with and offset with respect to the centers of electrodes 37 and 38 such that each zone overlies a greater portion of the electrode to the right than the electrode to the left. As explained in greater detail in the aforementioned Sangster patent and Berglund-Boll application, applying two-phase voltages $\phi_1$ and $\phi_2$ to electrodes 37 and 38 through conduction paths 39 and 40 creates alternately greater and lesser negative potentials on P-type zones 41 and 42. In accordance with this invention, these negative voltages are used to collect carriers released from the surface in the manner above described with reference to FIG. 1 and additionally are used to transfer carriers laterally from zone to zone along the back surface for achieving solid state read-out.

It should be noted in FIG. 3 that zones 41 and 42 which are used in the solid state scanning operation are illustrated as being substantially larger than the potential wells of depletion region 43 which are used for collection and integration of photogenerated holes.

Further, it will be seen that the zones 41 and 42 are not registered in any particular one-to-one correspondence with the depletion regions adjacent the front surface. From this it will be seen that the optical resolution of the apparatus will be determined by the size of zones 41 and 42, rather than by the size of the potential wells associated with the front surface. And further, it will be appreciated that zones 41 and 42 need not be registered or aligned in any sense with the depletion regions of the front surface. However, it will be appreciated that, in an imaging array having rows and columns of depletion regions associated with the front surface, the collecting zones 41 and 42 advantageously are aligned parallel with and, as nearly as possible, underlying either the rows or the columns of the array for ensuring that when integrated carriers are released from the front surface, as many as possible of them are collected by the closest collecting zone 41 or 42 for maintaining signal integrity and avoiding smearing of the signal. Of course, these considerations as to alignment, registration, and resolution are equally relevant to the other embodiments disclosed herein.

It is believed that from the foregoing description and analysis taken in conjunction with the knowledge of workers in the art a variety of ways of fabricating the structure of FIG. 3 will be apparent to those in the art and that methods of operating the structure also will be understood without further description.

Figure 4:
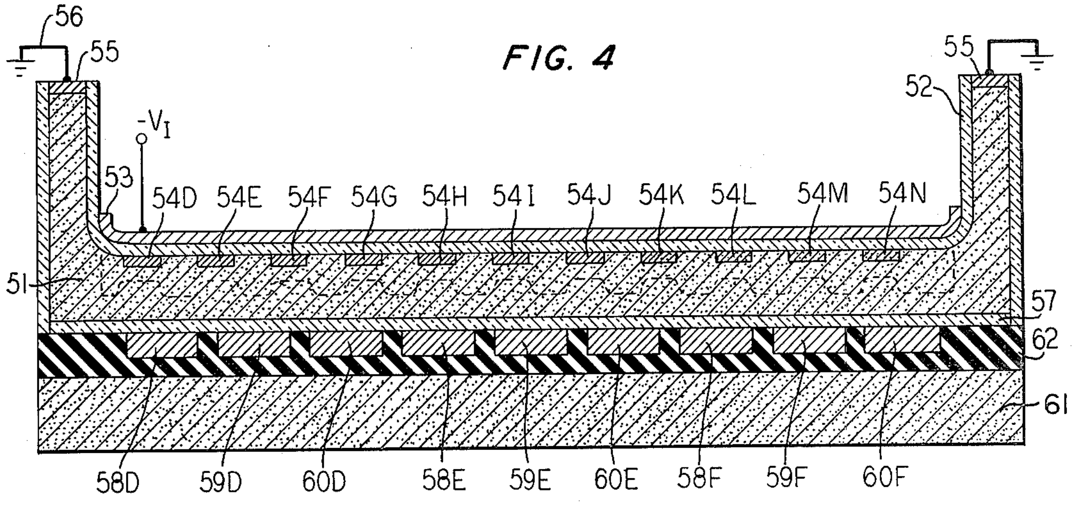
FIG. 4 is a cross-sectional view of still another embodiment of this invention drawn more nearly as it might appear in actual use.

Referring now to FIG. 4, there is shown a cross-sectional view of a portion of still another embodiment of this invention, illustrated more nearly as it might appear in actual use. As shown, the apparatus includes a bulk portion 51, again illustratively of N-type silicon, having a relatively thick ring-shaped peripheral portion by means of which the apparatus can be handled for mounting and positioning in actual use. As in the above-described embodiments, a dielectric layer 52 is disposed over the front surface of bulk 51, and a transparent conductive sheet 53 is disposed over the surface of dielectric 52. As in FIG. 3, potential wells are formed adjacent the front surface for collecting and integrating light through use of a potential $-V_I$ applied to conductive sheet 52 in combination with a plurality of surface zones of immobile charge, designated here as 54D, 54E,...54N. The solid state read-out means disposed over the back surface of bulk 51, as in FIG. 1, includes a dielectric layer 57 of uniform thickness over which there are disposed a plurality of electrodes 58D, 59D, 60D,...60F. The apparatus of FIG. 4 is adapted for three-phase solid state read-out; however, it will be appreciated that only for the purpose of convenience in illustration and that any of a wide variety of known charge transfer device types may be used.

For mechanical stability and ease of attaching to other parts of the overall system, the apparatus of FIG. 4 is shown mounted on a ceramic substrates 61 via an insulating compound 62, such as rubber or any of the resins known for such usage. Advantageously, of course, the ceramic substrate 61 may be premetallized with a pattern of conduction paths for connecting voltages to the charge coupled device electrodes 58, 59, and 60 prior to actual mounting of bulk portion 51 thereon.

Figure 5:
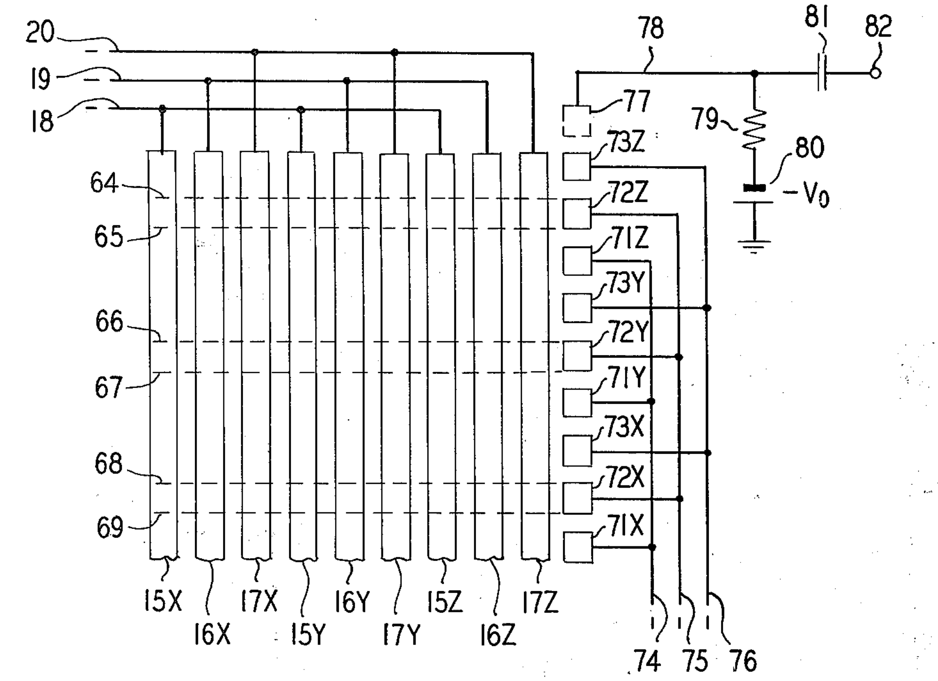
FIGS. 5 and 6 are schematic plan views depicting pluralities of charge transfer information channels as they might appear on the bottom surface of a wafer in accordance with this invention.
Figure 6:
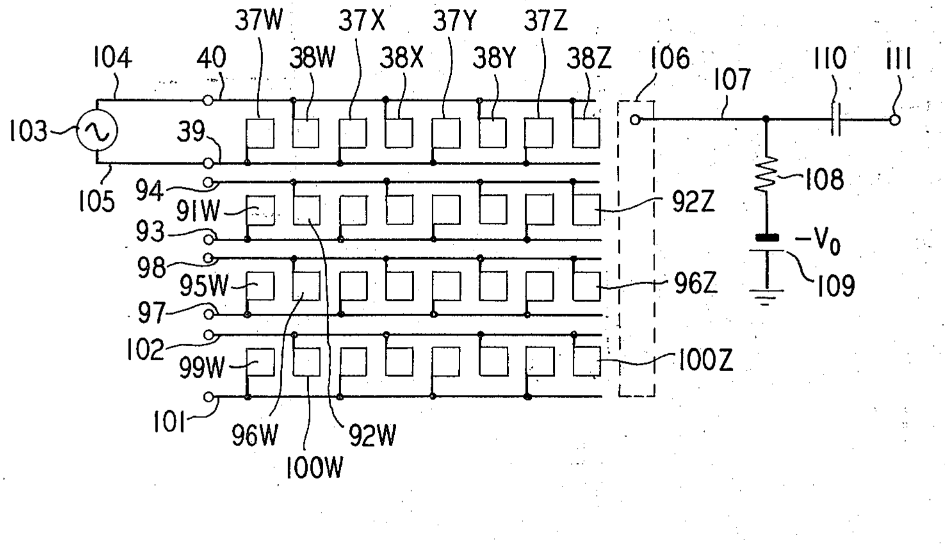

Referring now to FIGS. 5 and 6, there are shown schematic plan views depicting pluralities of charge transfer information channels as they might appear on the bottom surface of the wafer for effecting solid state read-out in accordance with this invention. In FIG. 5 reference numerals have been repeated from FIG. 1 where possible to indicate the correspondence between elements where appropriate.

As shown in FIG. 5, a plurality of closely spaced conductive strips 15X, 16X, 17X,...17Z are disposed over the surface, every third one being connected to a common one of three conduction paths 18, 19, and 20. Three information channels are shown, one being disposed between broken lines 64 and 65, another between broken lines 66 and 67, and still another between broken lines 68 and 69. In accordance with principles well known in the art, the back surface of bulk portion 10 is covered with a relatively thick dielectric layer, for example, 20,000 A ( 2 microns) everywhere except in the information channels, where the dielectric thickness may, for example, be about 1000 A (0.1 micron) so that voltages applied to conductive strips 15, 16, and 17 do not substantially affect the surface potential thereunder, except in the regions of thin dielectric. In this manner, the information channel regions are defined. It will be appreciated that, although three information channels are shown in FIG. 5, in a practical structure a great plurality, e.g., 100 to 1,000 information channels, typically would be defined over the back surface of a single imaging apparatus, the exact number depending upon the desired resolution of the apparatus.

In operation, sequential application of voltages to the conductive strips 15, 16, and 17 through conduction paths 18, 19, and 20 causes stored information to be moved sequentially and simultaneously to the right in the information channels. At the right side of FIG. 5 is shown an information channel defined by a plurality of localized electrodes 71X, 72X, 73X,...73Z disposed orthogonally with respect to the above-mentioned three channels to receive information from the three readout information channels and to sequentially transfer this information to an output detector portion.

For purposes of illustration, this output detector portion is shown including a simiconductive zone within broken-line 77 reverse-biased for collecting the carriers which arrive under the last CCD electrode 73Z, a conduction path connecting zone 77 with a serially disposed negative voltage 80 and an output sensing registor 79. It will be appreciated that zone 77 typically will be of semiconductivity type opposite to that of the information channel and is shown as a broken-line feature because it typically will be covered by the relatively thick dielectric layer mentioned above. A capacitor 81 is shown connected between resistor 79 and an output terminal 82, the capacitor being for DC voltage isolation in accordance with the principles well known in the art. In operation, charge collected by zone 77 causes current flow through registor 79 in proportion to the amount of charge collected, which, in turn, causes a proportional voltage to be developed over resistor 79 and to be conducted through capacitor 81 to output terminal 82.

In read-out operation, conduction paths 74, 75, and 76, connected to electrodes 71, 72, and 73, respectively, are pulsed so as to make electrodes 72 more negative than electrodes 71 and 73; and voltages are applied to conduction paths 18, 19, and 20 so as to transfer bits of information to the right, separate bits being transferred into electrodes 72X, 72Y, and 72Z. Once electrodes 72 have each received a bit, voltages are held in constant on conduction paths 18, 19, and 20, while all of the bits stored under electrodes 71, 72, and 73 are sequentially transferred up in the figure and are collected in seriatim by zone 77 and detected. Then another bit is transferred under each electrode and the operation continues in like manner. It will be appreciated that, in one sense, the apparatus depicted in FIG. 1 can be considered to be a cross-section taken longitudinally along a portion (not shown) of any of the information channels in FIG. 5.

Another technique of effecting the solid state scanning of apparatus in accordance with this invention is shown in schematic plan view in FIG. 6. Although this technique could as well be used with charge coupled device type structures as shown in FIG. 5, it is illustrated in FIG. 6 with bucket-brigade type structure as depicted on the bottom surface of the apparatus in FIG. 3. Reference numerals have been repeated from FIG. 3 where appropriate. In FIG. 6, four information channels are illustrated, although it will be appreciated that a greater plurality would probably be used in actual practice. A first channel is located under the path defined by electrodes 37W, 38W, 37X, 38X,...38Z, electrodes 37 being connected to a first conduction path 39 and electrodes 38 being connected to a second conduction path 40. In like manner, a second information channel is located under the path defined by electrodes 91W, 92W,...92Z, a first conduction path 93 being connected to electrodes 91 and a second conduction path 94 being connected to electrodes 92. A third information channel is located under the path defined by electrodes 95W, 96W,...96Z, a first conduction path 97 being connected to electrodes 95 and a second conduction path 98 being connected to electrodes 96. A fourth channel is located under the path defined by electrodes 99W, 100W,...100Z, a first conduction path 101 being connected to electrodes 99 and a second conduction path 102 being connected to electrodes 100.

In operation, information is sequentially transferred from a single channel to a reverse-biased semiconductive collecting zone, shown as broken-line rectangle 106, through application of two-phase voltages from voltage source 103 through conduction paths 104 and 105 to the conduction paths associated with that channel. As each bit from the channel is caused by the two-phase voltages to be transferred into and collected by zone 106, its presence causes a current to flow through conduction path 107, through resistor 108, and source of negative voltage 109, causing a proportional negative voltage to be conducted through a capacitor 110 and to appear at output terminal 111 in the manner well known in the art and as described with reference to FIG. 5.

After all of the information has been read from the first channel, conduction paths 104 and 105 are switched so as to be applied to conduction paths 93 and 94 for reading information from the second channel; and the procedure is repeated in like manner until all channels have been interrogated. Further details of the procedure will be appreciated by those in the art and will not be described further herein.

Although the invention has been described in part by making detailed reference to certain specific embodiments, such detail is intended to be, and will be understood to be, instructive rather than restrictive. It will be appreciated that many variations not expressly set forth may be made in the structures and modes of operation without departing from the spirit and scope of this invention as disclosed herein.

For example, it will be appreciated that the conductivity types in the structures may be interchanged as desired, provided suitable changes in voltage polarities also are made. Further, it will be appreciated that the photosensing medium need not be semiconductive but may be any material having photosensitive properties and having at least surface portions suitable for change transfer device operation.

It will also be appreciated, as alluded to hereinabove, that any charge transfer device structure may be used for solid state scanning. More specifically, by way of example, although three-phase charge coupled device structures and bucket-brigade structures have been illustrated for the solid state scanning, it will be appreciated that any two-phase charge coupled device structures, such as those employing combinations of thick and thin dielectric portions and those employing fixed portions of immobile charge disposed under a relatively uniformly thick insulating layer, may as well be used. Further details of the modes of operation of two-phase charge coupled device structures may be found, for example, in U.S. Pat. No. 3,651,349, issued May 21, 1972, to D. Kahng and E. H. Nicollian in U.S. Pat. application Ser. No. 157,509, filed June 28, 1971, in the names of R. H. Krambeck and R. H. Walden; and in U.S. Pat. application Ser. No. 157,507, filed June 28, 1971, in the names of G. H. Amelio, R. H. Krambeck, and K. A. Pickar, all assigned to the assignee hereof.

Still further, it will be appreciated that the apparatus disclosed herein can be used for purposes other than optical imaging in the same manner that the diode array silicon camera tube can be used and, further, that the apparatus disclosed herein has the added advantage over the conventional camera tube that the apparatus herein allows advantageous exact access to quantized picture elements. Known optical imaging applications to which the apparatus is readily adapted are as a hologram read-out, X-ray, and nonoptical spectra detection and particle detection.

Still further, it will be appreciated that the apparatus disclosed herein can be used in situations wherein very low levels of incident radiation is to be detected by applying sufficient voltage to the front surface such that the apparatus is biased very near to avalanche breakdown at the front surface. In this manner, photogenerated carriers gain enough energy in the depletion region to cause proportional electron-hole pair creation by impact ionization, thereby yielding an amplification of the photogenerated carriers in accordance with principles now known in the art.

Still further, it will be appreciated that, although the detailed disclosure has been primarily in terms of a two-dimensional imaging array, the apparatus may as well be designed in a line-imaging format, i.e., a linear array, if such is desired. Accordingly, as is conventional in the art, the words "matrix" and "array" will be construed as including a one-dimensional matrix, which also is sometimes termed a linear array.

What is claimed is:

1. Charge transfer imaging apparatus comprising:

a photosensitive semiconductor wafer having a pair of substantially parallel surfaces on opposite sides thereof, at least one of the pair being suitable for charge transfer device operation;

a transparent first dielectric layer disposed over and contiguous with a first one of said surfaces;

a transparent conductive sheet disposed substantially over said first dielectric layer;

first circuit means coupled to the conductive sheet for applying thereto a first voltage sufficient to form in combination with said wafer, layer and sheet a matrix of potential wells adjacent to said one surface in said wafer for storage of mobile charge carriers generated in said medium;

a second dielectric layer disposed over and contiguous with the other of said surfaces;

a plurality of charge transfer information channels disposed over and including said second layer and said other surface, each including a row of a plurality of spaced, localized electrodes disposed over the second layer;

second circuit means coupled to the electrodes of the information channels for applying voltages thereto sufficient for effecting simultaneous collection of the charge carriers stored in said potential wells and for effecting charge transfer along said channels;

the wafer being sufficiently thin that mobile charge carriers stored in the potential wells associated with the front surface can be transferred through the wafer to the potential wells of the charge transfer information channels associated with the other surface without incurring avalanche breakdown in the wafer.

2. Apparatus is recited in claim 1 wherein the charge transfer information channels are aligned with respective rows of the matrix of potential wells associated with the first surface.

3. Apparatus as recited in claim 1 wherein the thickness of the wafer is less than a diffusion length for the mobile charge carriers.

4. Apparatus as recited in claim 1 wherein the means for forming the matrix of depletion regions adjacent the one surface includes an array of thick-thin portions of the first dielectric with which the conductive sheet is contiguous.

5. Apparatus as recited in claim 1 wherein the means for forming the matrix of potential wells adjacent the one surface includes a matrix of zones of immobile charge disposed adjacent the first surface of the wafer.

6. Apparatus as recited in claim 5 wherein the immobile charge is disposed in the wafer and adjacent the surface thereof.

7. Apparatus as recited in claim 1 wherein:

the matrix associated with the front surface includes a plurality of mutually parallel rows of potential wells; and the plurality of information channels are mutually parallel and parallel to the rows.

8. Apparatus as recited in claim 1 wherein the plurality of spaced, localized electrodes are serially disposed over the second layer in a line substantially parallel with a row of the matrix associated with the front surface.

9. Apparatus as recited in claim 1 wherein said first circuit means further includes a second voltage sufficient to release any charge carriers stored in said potential wells.

10. Apparatus as recited in claim 1 wherein the second circuit means includes means for applying to selectd electrodes voltages sufficient to cause thereunder potential wells extending completely through the wafer.

11. Apparatus as recited in claim 3 wherein the thickness of the wafer is greater than an absorption length for those wave lengths to which the wafer is photosensitive.

12. Apparatus as recited in claim 11 wherein the thickness of the wafer is about 15 microns.

13. Charge transfer imaging apparatus comprising a photosensitive semiconductor wafer having a pair of substantially parallel surfaces on opposite sides thereof, at least one of the pair being suitable for charge transfer device operation;

a transparent first dielectric layer disposed over and contiguous with a first one of said surfaces;

a transparent conductive sheet disposed substantially over said first dielectric layer;

means in combination with said wafer, layer, and sheet for forming a matrix of mutually parallel rows of potential wells adjacent to said one surface in said wafer in response to sufficient voltage applied to said conductive sheet for storage of mobile charge carriers generated in said medium;

a second dielectric layer disposed over and contiguous with the other of said surfaces; and a plurality of charge transfer information channels disposed over and including said second layer and said other surface, each including a row of a plurality of spaced, localized electrodes serially disposed over the second layer in a line substantially parallel with a row of the matrix associated with the first surface such that in response to sufficient voltages applied to said electrodes there are formed a plurality of potential wells adjacent said other surface;

the wafer being sufficiently thin that mobile charge carriers stored in the potential wells associated with the first surface can be transferred through the wafer to the potential wells of the charge transfer information channels associated with the other surface without incurring avalanche breakdown in the wafer.

14. Apparatus as recited in claim 13 wherein the charge transfer information channels are aligned with a respective rows of the matrix of potential wells associated with the first surface.

15. Apparatus as recited in claim 13 wherein the thickness of the wafer is less than a diffusion length for the mobile charge carriers.

16. Apparatus as recited in claim 13 wherein the means for forming the matrix of depletion regions adjacent the one surface includes an array of thick-thin portions of the first dielectric with which the conductive sheet is contiguous.

17. Apparatus as recited in claim 13 wherein the means for forming the matrix of potential wells adjacent the one surface includes a matrix of zones of immobile charge disposed adjacent the first surface of the wafer.

18. Apparatus as recited in claim 17 wherein: the immobile charge is disposed in the wafer and adjacent the surface thereof.

19. Apparatus as recited in claim 13 further including:

a first circuit means coupled to the conductive sheet for alternately applying thereto a first voltage sufficient to form the matrix of potential wells and a second voltage sufficient to release any charge carriers stored in said potential wells; and second circuit means coupled to the electrodes of the information channel for applying multi-phase voltages thereto sufficient for effecting collection of the released charge carriers and for effecting charge transfer along said channel.

20. Apparatus as recited in claim 17 wherein the second circuit means includes means for applying to selected electrodes voltages sufficient to cause thereunder potential wells extending completely through the wafer.

21. Apparatus as recited in claim 15 wherein the thickness of the wafer is greater than an absorption length for those wave lengths to which the wafer is photosensitive.

22. Apparatus as recited in claim 21 wherein the thickness of the wafer is about 15 microns.

* * * * *

UNITED STATES PATENT AND TRADEMARK OFFICE

CERTIFICATE OF CORRECTION

PATENT NO. : 3,906,543

DATED : September 16 , 1975

INVENTOR(S) : George E. Smith and Frederick Vratny

It is certified that error appears in the above-identified patent and that said Letters Patent are hereby corrected as shown below:

Col. 4, line 27, delete "to about" and insert --of about--.

Col. 4, line 49, change "disgrams" to --diagrams--.

Col. 5, line 7, after "potential" insert --wells--.

Col. 5, line 38, after "portion" insert --10--.

Col. 6, line 5, after "not" delete "to".

Col. 6, line 47, change "water" to --wafer--.

Col. 7, line 24, after "41E" insert --42E--.

Col. 8, line 27, after "that" insert --such is--.

Col. 8, line 32, change "substrates" to --substrate--.

Col. 9, line 17, change "simiconductive" to --semiconductive--.

Col. 9, line 44, after "held" omit --in--.

Col. 13, claim 14, line 3, delete "a".

Signed and Sealed this

*second* Day of *March 1976*

[SEAL]

*Attest:*

RUTH C. MASON
*Attesting Officer*

C. MARSHALL DANN
*Commissioner of Patents and Trademarks*